United States Patent Office 3,393,144
Patented July 16, 1968

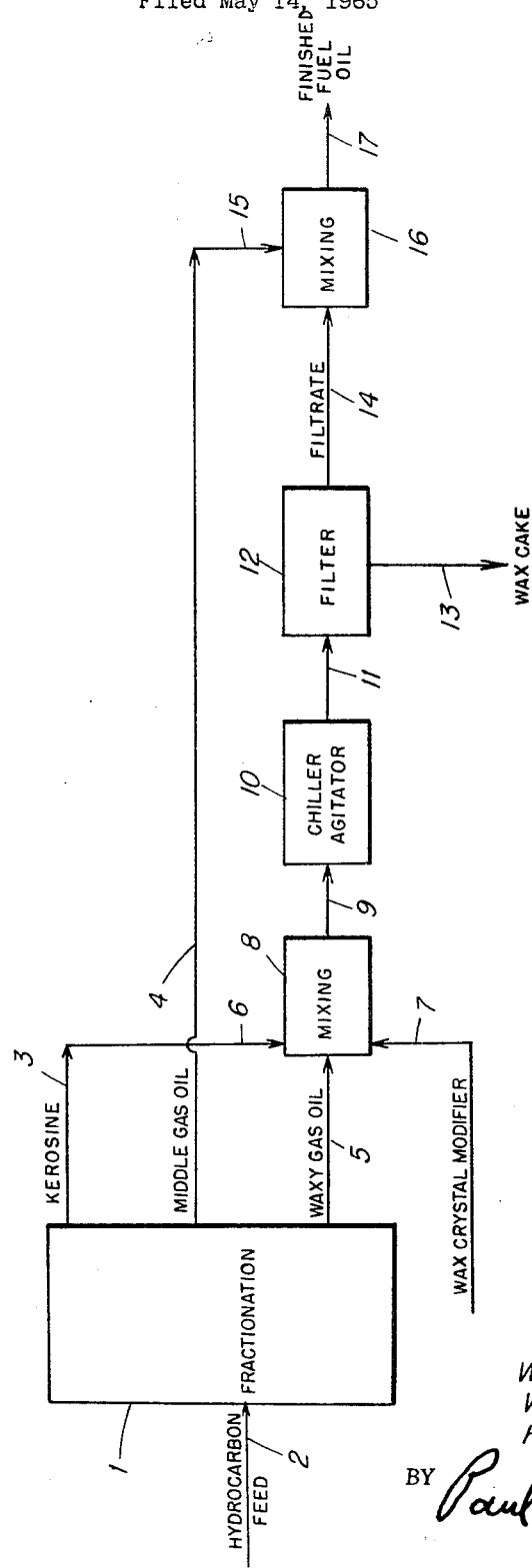

3,393,144
DEWAXING PROCESS USING A LOW BOILING FRACTION OF FUEL OIL TO REDUCE THE VISCOSITY OF A HIGH BOILING FRACTION OF FUEL OIL
Harold O. Button, Highland Park, William G. Franz, Woodbury, and William H. King, Gloucester, N.J., assignors to Mobil Oil Corporation, a corporation of New York
Filed May 14, 1965, Ser. No. 455,785
2 Claims. (Cl. 208—28)

This invention relates to a process for dewaxing distillate fuel oils. More particularly, this invention relates to a dewaxing process for producing distillate fuel oils having desirable low temperature characteristics such as a low cloud point, a low filterability temperature and a low pour point, wherein the need for separating oil from a dewaxing solvent is eliminated.

At the present time it is necessary that fuel feed systems and fuel storage systems be kept free of solids in order to maintain free flow of fuel. The fuel oil distillate fractions obtained from crude oils contain an undesirable amount of wax which precipitates at relatively low temperatures. In order to conveniently burn these distillate fuel oils, it is necessary to lower the cloud point thereof by removing much of the wax therein. At the present time, wax is removed from oil fractions by precipitation under conditions of relatively low temperature followed by a filtration step which separates the wax from the oil. It has been proposed to add certain polymeric materials as wax crystal modifiers to waxy oils in order to increase filtration rates. It also has been proposed to agitate the cooled oil-wax mixtures to increase filtration rates. It has been found that the use of either of these two expedients in dewaxing processes promotes a change in the wax particles which causes the separated wax cake to be somewhat porous rather than in the form of relatively impervious plates. It is believed that polymeric wax crystal modifiers cause offset paraffin molecule alignment during wax crystal formation which results in a non-uniform crystal surface. When these crystals are brought together during a filtration step, the wax cake so formed is relatively porous due to the non-uniform wax crystal surfaces. This wax cake porosity facilitates separation of oil from wax in the filtration step. Similarly, it is believed that agitation of the slurry causes the wax particles, during the filtration step, to form non-parallel layers which produces a relatively porous wax cake. However, it has been found that the use of slurry agitation or a wax crystal modifier or a combination thereof is frequently limited by the viscosity of the slurry produced in the cooling step and the viscosity of the oil filtrate. When the ratio of solid wax to oil in the slurry is high, or if the oil filtrate viscosity is too high, filtration proceeds at an unsatisfactorily slow rate. In order to obtain high wax filtration rates, it is necessary to reduce the slurry viscosity and filtrate viscosity to a desirable level. Of course, the slurry viscosity can be reduced by heating the fraction being dewaxed but this permits more of the wax to become liquefied and the resultant oil filtrate will possess an unsatisfactorily high cloud point.

At the present time, solvents such as propane or a mixture of toluene and methyl ethyl ketone are employed in dewaxing processes in admixture with the oil to be dewaxed. These solvents assist in maintaining slurry and filtrate viscosities within desirable levels. The mixture of solvent or solvents and waxy oil is heated to assure complete solution of the total mixture and is then chilled to 20° F. to 50° F. below the desired pour point of the dewaxed oil. Wax particles are then removed from the chilled solution of oil and dewaxing solvent by filtration. Other dewaxing solvents including higher molecular weight ketones such as methyl n-propyl ketone and methyl isobutylketone are employed to assist in reducing refrigeration costs since these solvents permit the use of a lower temperature differential between product pour point and filtering temperature. While it has been found that the use of a solvent in a dewaxing process results in a lowering of the slurry and filtrate viscosities, the costs of these solvents are relatively high and their solubility-temperature relationships with the oil to be dewaxed often limit their use. In all of these processes the solvent must be separated from the recovered oil both for purposes of economy and for purposes of maintaining the quality of the fuel oil. Thus additional costs are incurred from the standpoint of necessary separation apparatus and from the standpoint of time consumed in a solvent separation step. It is therefore desirable to eliminate the use of a solvent separation step in order to greatly reduce the cost of dewaxing oils even though an advantage is gained with solvents through the reduction of slurry and filtrate viscosities.

The term cloud point as employed herein is the temperature at which paraffin wax or other solid substances begin to crystallize out or separate from solution when the oil is chilled under definite prescribed conditions. The term pour point as employed herein is the lowest temperature at which the oil will pour or flow when it is chilled without disturbance under definite prescribed conditions. The cloud points and pour points shown herein were obtained by the tests described in ASTM-D-97-57.

The present invention provides for a dewaxing process which permits the wax to be precipitated at a temperature sufficiently low to produce an oil filtrate having a low cloud point. Further, the present invention provides a dewaxing process wherein a solvent separation step is eliminated while at the same time maintaining the viscosity of the cooled wax-oil mixture to be filtered within a range which promotes ease of filtration.

In accordance with the present invention, a distillate fuel oil fraction boiling in the range of from about 300° F. to about 750° F. is separated into a high boiling fraction containing the large majority of the wax hydrocarbons and a low boiling fraction which contains an insignificant amount of wax hydrocarbons. To the high boiling fraction is added a wax crystal modifier which during the subsequent chilling and wax separation steps causes the wax to separate in the form of crystals which produce relatively porous wax cakes. The mixture of wax crystal modifier and high boiling waxy hydrocarbon fraction is then directed to a chilling step wherein it is caused to precipitate from solution. The solid wax particles and oil are then agitated together at a low temperature in order to form a slurry. It has been found that agitation results in increased cooling efficiencies. The slurry obtained from the agitation step is usually characterized by a high viscosity especially when the fuel oil distillate is obtained from crude oils having a high wax content. Similarly, the viscosity of the oil component is increased upon lowering the temperature thereof. The oil viscosity may be such as to severely limit the amount of cooling which can be performed and correspondingly to severely limit the amount of wax which can be separated. For purposes of the present invention, to obtain satisfactory filtering rates the viscosity of the oil filtrate should be below about 40 centipoises and preferably below about 30 centipoises at the filtering temperature. At this filtrate viscosity, the slurry feed to the filtration step is maintained at a viscosity below about 90 and preferably below about 45 as measured on the 100 scale of Brookfield viscosity with a No. 1 spindle at 30 r.p.m. A portion of the low boiling fraction is added to the agitated cooled slurry in an amount sufficient to lower the slurry viscosity and oil filtrate viscosity within the limits set forth above. The slurry is then separated into the wax component and the oil component by filtration. The oil filtrate thus produced does not require a subsequent solvent separation step and is characterized by a relatively low cloud point.

In accordance with one embodiment of the present invention, a distillate fuel oil fraction boiling in the range of from about 300° F. to about 750° F. is separated into a low boiling fraction, a middle fraction and a high boiling waxy fraction. The low boiling fraction and the middle fraction do not contain a significant amount of wax which must be separated in order to be employed in fuel oil blends. The waxy fraction, on the other hand, contains wax in a significant amount which must be removed in order to obtain fuel oils having a satisfactorily low cloud point. The waxy fraction of the crude petroleum which is dewaxed has an initial boiling point corresponding to that portion of the crude which has a cloud point which corresponds to that of the desired final fuel and preferably an initial boiling point corresponding to that portion of the crude which has a cloud point from about 40° F. to about 70° F. above the desired cloud point of the final fuel. The end boiling point corresponds to that above which the desired characteristics of flash point, boiling range and/or specific gravity would not be met by the final fuel. The portion of the crude which corresponds to the desired waxy fraction initial boiling point can be easily determined by testing incremental fractions of about 2 volume percent for the cloud point, which corresponds to the desired low temperature characteristics of the fuel. The boiling range of the waxy fraction depends upon the crude petroleum which is employed and the desired fuel oil specifications of cloud point, pour point, filterability, flash point, specific gravity and/or boiling range. To the waxy fraction is added a wax crystal modifier which, during the subsequent chilling and wax separation, causes the wax crystals to separate out in a form which produces relatively porous wax cakes. The mixture of waxy fraction and wax crystal modifier is then mixed with all or a portion of the low boiling fraction in order to reduce the viscosity thereof. The resultant mixture is then directed to a cooling step wherein it is cooled to the initial wax crystallization temperature. Following the attainment of the wax crystallization temperature the chilling rate should be adjusted to promote the best crystal structure which would contribute to optomization of the oil filtration rate. Upon further cooling, the wax is caused to precipitate from the oil. Depending upon the final temperature maintained during the cooling step, a certain amount of the wax is precipitated from the oil. The lower the final temperature in the cooling step, the more wax is precipitated from solution. The cooled mixture of oil, wax and wax crystal modifier is then subjected to an agitation step in order to form a slurry of wax in oil. The final cooling temperature and amount of low boiling fraction added are adjusted in order to maintain the viscosity of the resultant slurry and oil filtrate within the limits set forth above. It has been found that when this is accomplished, the subsequent filtration of the wax from the oil proceeds at acceptably high filtration rates. Although the wax can be separated at viscosities above that set forth hereinbefore, the separation is quite difficult and does not proceed at a sufficiently high rate in the presently available filtration equipment to afford practical use. The cooled wax-oil slurry is then directed to a filtration step wherein the wax is separated therefrom. The filtrate has a low cloud point and can be employed as a fuel oil as, for example, diesel oil, home heating oil, and the like. The middle fraction obtained in the first fractionating step can be stored separately or it can be blended in whole or in part with the filtrate to produce a high quality blend of fuel oil.

In accordance with another aspect of the present invention, the low boiling fraction can be added to the waxy fraction after it has been cooled and agitated but before it is filtered. When the low boiling fraction is added in this manner, it is cooled to the temperature of the slurry withdrawn from the agitation step in order that the precipitated wax will not return to solution. The low boiling fraction is added to the slurry in amounts sufficient to lower the viscosity thereof and the resultant oil filtrate viscosity within the ranges set forth above.

The fractionation step which is a distillation operation is carried out to obtain a number of hydrocarbon fractions from a distillate fuel oil boiling in the range of from about 300° F. to about 750° F. which minimizes the needed system capacity while obtaining a low cloud point oil and a sufficient amount of low boiling fraction to regulate the slurry and filtrate viscosities. The fractionation step can be carried out to obtain one high boiling waxy fraction and one lower boiling fraction. While the process can be conveniently carried out when two fractions are obtained, it is preferred to further fractionate the lower boiling fraction for the reasons set forth below. In any event, the high boiling waxy fraction is not fractionated into a plurality of fractions and the degree to which the lower boiling fraction is fractionated is dependent upon the amount of diluent needed to lower the slurry and filtrate viscosities within acceptable limits. It has been found that the process of the present invention is most conveniently carried out when the distillate fuel oil is fractionated into a waxy high boiling fraction, a middle fraction and a low boiling fraction. When this is accomplished, the integrated process herein described can be carried out conveniently. The fractionation step serves to segregate the wax constituents which must be removed into a relatively small amount of oil. This facilitates the wax separation by reducing the amount of refrigeration capacity necessary through the reduction of the amount of oil passed through the cooling step and wax separation step. By separating the material boiling below the waxy high boiling fraction into a low boiling fraction and a middle fraction, an increase in efficiency of the overall process is obtained. This is because the low boiling fraction has a lower viscosity than the middle fraction and thus when this fraction is employed as the diluent for the oil-wax slurry, a greater lowering of slurry viscosity per unit volume of diluent is obtained than would be obtained when the lower boiling hydrocarbons had not been further fractionated. Therefore, a further lowering of needed refrigeration capacity is obtained. The end boiling point of the low boiling fraction is not critical and will vary depending upon the type of crude oil employed. All that is required is that a sufficient amount of low boiling fraction is obtained to lower the wax-oil slurry below the ranges set forth above. It is preferred that the low boiling fraction be of a sufficiently low viscosity to minimize the refrigeration capacity needed while at the same time affording its use in a high quality fuel oil blend. Since the low boiling fraction which is employed as the diluent in the process of this invention can be employed in a fuel oil blend, it is not necessary to later separate the same from the fuel oil product. In this manner a subsequent solvent separation step is eliminated.

The added wax crystal modifier is selected so that it will cause a change in the wax structure as described above and thus provide increased wax filtration rates. Among the wax crystal modifiers which can be employed in the process of the present invention are alpha or beta olefin polymers with a molecular weight from about 700 to about 2800 prepared from olefins containing 15 to 21 carbon atoms, ethylene-vinyl acetate copolymers, polymeric vinyl esters of stearic and palmitic acids and the like. It is to be understood that any wax crystal modifiers can be employed so long as it effectively prevents the wax crystals from precipitating out of solution in the form which produces a relatively impervious wax cake. In the process of the present invention, the wax crystal modifier is added in amounts of from about 0.001 to about 3 percent by weight and preferably from about .02 to about .5 percent by weight based upon the weight of the waxy gas oil. It has been found that the increased wax crystal modification obtainable when above about 3.0 percent by weight wax crystal modifier is added is not significant from the standpoint of wax filtration rates.

In the cooling step, the mixture of waxy oil and wax crystal modifier which may include a portion of the low boiling fraction is cooled in order to effect precipitation of the wax from solution. The amount of cooling in this step is dependent upon the desired cloud point of the fuel oil product. The dewaxing temperature usually employed is the temperature defining the critical low temperature characteristic desired in the final fuel plus or minus 5° F. However, this temperature can be adjusted upward or downward outside of this range in order to provide the desired low temperature characteristics at the highest dewaxing temperature permissible, as for example when unusually small or large amounts of low boiling fractions are employed. The cooling in the process of this invention can be carried out either simultaneously with the agitation step or as a separate step. Examples of cooling apparatus which can be conveniently employed in the cooling step of the present invention are; conventional double pipe chillers with spring loaded scrapers, as well as any jacketed refrigeration apparatus equipped with an agitator.

As noted above, the agitation of the cooled wax-oil mixture can be carried out prior to filtration either simultaneously with the cooling step or immediately subsequent thereto. Agitation of the wax-oil slurry has been found to be necessary even when using a wax crystal modifier in order to obtain the desired wax particle form during filtration.

The degree of agitation necessary in the process of this invention is that which, in combination with both the wax crystal modifier and the use of the low boiling hydrocarbon diluent, produces a porous wax filter cake and a lowering of the slurry viscosity to a point within the limits set forth above. This can be conveniently determined by correlating the slurry viscosity, a non-Newtonian liquid and the oil filtrate, a Newtonian liquid. The amount of low boiling hydrocarbon fraction that is necessary to reduce the oil filtrate viscosity to below about 40 centipoises is first determined. This represents the minimum amount of low boiling hydrocarbon fraction which must be added. The combination of agitation and amount of wax crystal modifier which is necessary to reduce the slurry viscosity to within the limits set forth above is then determined. The degree of agitation necessary will vary inversely with the amount of wax crystal modifier employed but can be easily determined in the manner set forth above. The agitation can be accomplished conveniently by various methods such as by the use of a rotary impeller, a pump which vigorously circulates the slurry, stationary mixing nozzles, sonic vibrators and the like.

Since the wax-oil slurry obtained in the process of the present invention is a non-Newtonian liquid, the viscosity thereof can be conveniently measured with a Brookfield Viscometer. The Brookfield Viscometer and its operation is described in "Development of Research Technique for Evaluating the Low Temperature Fluidity of Automatic Transmission Fluids," published by Coordinating Research Council, Inc., published February 1963, Appendix A and designated as CRC L–45–1262.

As previously stated, all or a portion of the low boiling fraction is mixed with the oil-wax slurry and this mixing can be accomplished either prior to the cooling and agitating steps or after the cooled slurry has been agitated. In addition, the low boiling fraction can be added to the waxy oil mixture in a step-wise manner. That is, the low boiling diluent fraction is added in incremental amounts in a cooled condition at a plurality of stages in the process. The diluent is added in a cooled condition so as to minimize the liquefication of wax. In this manner effective mixing of diluent and waxy oil is attained which permits more efficient use of the diluent. The low boiling fraction is added to reduce the slurry viscosity and the filtrate viscosity within the ranges set forth above and, therefore, all that is necessary is that it be added prior to the filtration step. When the low boiling fraction is added to the cooled oil-wax slurry, it is cooled to the temperature of the slurry prior to being added thereto. The amount of low boiling fraction added is that which is sufficient to lower the filtrate viscosity to below about 40 centipoises while at the same time maintaining the flash point and specific gravity within the desired limits.

The oil-wax separation step can be carried out in various filtering processes well known in the art. Examples of such processes include vacuum filtration, basket centrifuging, pressure filtering and the like. The separation step can be carried out while employing an aqueous brine solution as a wax cake wash. The brine removes much of the oil in the wax cake and is easily separable from the oil since it forms a separate lower liquid phase. The oil and brine are separated by decantation.

Referring now to FIGURE 1, a hydrocarbon feed boiling in the range of from about 338° F. to about 750° F. is directed to a fractionation step 1 through conduit 2. In the fractionation step 1, the hydrocarbon feed is separated into a kerosine fraction boiling in the range of from about 335° F. to about 400° F. to about 5900° F. and a waxy gas oil fraction boiling in the range of from about 5900° F. to about 750° F. The kerosine fraction is withdrawn from fractionator 1 through conduit 3. The middle gas oil fraction is withdrawn from fractionator 1 through conduit 4 and the waxy gas oil fraction is withdrawn from fractionator 1 through conduit 5. The kerosine fraction is directed through conduit 6 to admixture with the waxy gas oil fraction at mixing step 8 and a wax crystal modifier is added to the mixture through conduit 7. The resultant mixture of waxy gas oil, kerosine and wax crystal modifier is directed through conduit 9 to a chiller 10 wherein it is cooled to a temperature below about +10° F. to precipitate the wax contained in the waxy gas oil fraction. In the chiller 10, the cooled mixture is agitated sufficiently to form a slurry having a Brookfield viscosity below about 90 when measured at 30 r.p.m. The slurry is removed from the chiller 10 through conduit 11 and directed to filtration step 12 wherein the precipitated wax and oil are separated. The wax is removed from the filtration step by vacuum filtration. The oil filtrate which is a mixture of kerosine and dewaxed gas oil is removed from filtration step 12 through conduit 14 and directed to mixing step 16. The middle gas oil fraction is directed from fractionation step 1 through conduits 4 and 15 to mixing step 16 and the resultant fuel oil blend is removed from mixing step 16 through conduit 17.

The process of the present invention is particularly useful when crudes having a large amount of wax therein are employed as, for example, Libyan crudes. When these crudes are employed the yield of middle distillate fuel oil is greatly increased.

The following examples are intended to more fully describe the invention and are not to be interpreted as limiting the same.

EXAMPLE I

This example illustrates the effect of a wax crystal modifier and a kerosine diluent on the wax filtration rates in the dewaxing process of the present invention.

Brega crude was fractionated to produce a kerosine fraction boiling in the range of from about 320° F. to 400° F., a middle gas oil fraction boiling in the range of from 400° F. to 590° F. and a waxy gas oil fraction boiling in the range of from 638° F. to 746° F. The waxy gas oil fraction employed in the process of this invention had the following properties:

TABLE 1

| | |
|---|---|
| Boiling Range, °F. | 638–746 |
| Viscosity, SUS at 100° F. | 73.4 |
| Gravity, °API | 30.9 |
| Yield, percent wt. of crude | 12.6 |
| Pour Point, °F. (upper) | 75 |
| Wax content, percent wt. | 18.9 |

Three separate samples were processed with varying amounts of wax crystal modifier and kerosine fraction in each as shown by Table 2. Each waxy gas oil sample was mixed with either a wax crystal modifier or the kerosine fraction or both and directed to a double pipe chiller wherein the wax was precipitated. In the chiller, the mixture of wax and oil was agitated to produce a wax-oil slurry. The resultant cooled slurry was then directed to a basket centrifuge wherein the wax and oil were separated at a speed of about 2900 to 3500 r.p.m. The excess wax in the filter was scraped off and recovered. The following table shows the effect of wax crystal modifier and kerosine diluent on the wax filtration rates.

TABLE 2

| | Sample | | |
|---|---|---|---|
| | 1 | 2 | 3 |
| Wax Crystal Modifier, percent wt.: | | | |
| Ethylene-Vinyl Acetate Copolymer M.W. about 1,500–2,200 | 0.06 | None | 0.06 |
| Kerosine (320–400° F.) wt. percent | | 44.7 | 44.7 |
| Brookfield Viscosity, of slurry Spindle No. 1 at 30 r.p.m | (¹) | ² 145 | ³ 6.3 |
| Slurry Feed Temperature, °F | 25 | 23 | 24 |
| Charge Time, sec | 240 | 60 | 60 |
| Cake Dry Time, sec | 120 | 120 | 60 |
| Filtration Rate During First 60 Seconds of Charge Time, gal./ft.²/hr | 2 | 9 | 46 |
| Wax Cake: | | | |
| Thickness, mm | Oily | Oily | 7.5 |
| Oil Content, percent wt | (⁴) | (⁴) | 17.6 |
| Filtrate: Pour Point | | | |

¹ Very viscous.
² 28° F.
³ 26° F.
⁴ Excessive.

As can be seen from the above table, both the use of a wax crystal modifier and the kerosine diluent has a great effect on the wax filtration rates in the dewaxing process of the present invention.

TABLE 4

| | Sample | | | |
|---|---|---|---|---|
| | 1 | 2 | 4 | 4 |
| Impeller Speed | 250 | 500 | 1,000 | 1,000 |
| Chilling Rate, °F./min | 1.1 | 1.2 | 1.2 | 1.1 |
| Wax Crystal Modifier, wt. percent | .06 | .06 | .06 | .03 |
| Brookfield Viscosity–Torque at— | | | | |
| 30 r.p.m | 45.6 | 38.4 | 30.5 | 55.5 |
| 60 r.p.m | 85.2 | 74.3 | 59.7 | 100+ |
| Slurry Temperature, °F | 26 | 25 | 24 | 25 |
| Charge Time, sec | 60 | 60 | 120 | 115 |
| Cake Dry Time, sec | 240 | 180 | 120 | 120 |
| Filtration Rate, During First 60 Seconds of Charge Time, gal./ft.²/hr | 23 | 26 | 36 | 21 |
| Filtrate Pour Point (upper) | 25 | 25 | 30 | 30 |

EXAMPLE II

This example illustrates the effect of agitation on the filtration rates in the process of the present invention. A Zarzaitine crude fraction boiling in the range of from about 320° F. to about 700° F. was fractionated to produce a waxy gas oil fraction. The Zarzaitine crude waxy gas oil fraction had the following properties:

TABLE 3

| | |
|---|---|
| Boiling range, °F. | 540–700 |
| Viscosity, SUS at 100° F. | 47.3 |
| Gravity, °API | 35.9 |
| Yield, percent wt. of crude | 13.4 |
| Pour point, °F. (upper) | 40 |
| Wax content, percent wt. | 6.7 |

The waxy gas oil fraction was divided into four samples which were processed at varying degrees of agitation as shown in Table 4. Each sample was mixed with a wax crystal modifier of ethylene-vinyl acetate copolymer having a molecular weight of from about 1500 to about 2200 in amounts shown in Table 4. The resultant mixtures were then directed to chiller wherein they were chilled and agitated. The chiller consisted of a vertical jacketed cylindrical vessel 10 inches long and having a diameter of 6 inches and a shallow cone-bottom 1½ inches deep. A rotating impeller inside the vertical cylinder measuring 2 3/16 inches from tip to tip was employed to agitate the mixture. Refrigeration medium was circulated inside the jacket to cool the mixture. Under the influence of cooling, the wax precipitated from the oil and was mixed with the oil by the impeller to form a slurry. The slurry was then directed to a basket centrifuge which was rotated at a speed of from 3400 to 3500 r.p.m. The wax was retained on the filter and the oil filtrate was allowed to pass through to be recovered.

As can be seen from the above table the amount of agitation has a great influence on the filtration rates for the separation of precipitated wax from oil.

Having fully described the invention, we claim:

1. The process for dewaxing a distillate fuel oil hydrocarbon which comprises fractionating a distillate fuel oil hydrocarbon fraction boiling within the range of from about 300° F. to about 750° F. to obtain a low boiling fraction, a middle fraction, and a high boiling waxy fraction, mixing said high boiling waxy fraction with a wax crystal modifier and a portion of said low boiling fraction, agitating and cooling said mixture to obtain a slurry of wax solids, the amount of modifier and low boiling fraction added and the degree of agitation being sufficient to lower the Brookfield viscosity of the slurry to below about 90 when measured at 30 r.p.m. on Spindle No. 1 and sufficient to lower the filtrate viscosity to below about 40 centipoises and filtering said slurry to obtain a wax component and an oil filtrate.

2. The process of claim 1 wherein the amount of wax crystal modifier added is between about 0.001 and 0.2 weight percent based upon the weight of the high boiling waxy fraction.

References Cited

UNITED STATES PATENTS

| | | | |
|---|---|---|---|
| 2,664,388 | 12/1953 | Winterhalter | 208—15 |
| 2,725,338 | 11/1955 | Perry | 208—37 |
| 3,052,628 | 9/1962 | Edwards et al. | 208—38 |
| 3,262,873 | 7/1966 | Tiedje et al. | 208—38 |

DANIEL E. WYMAN, *Primary Examiner.*

P. E. KONOPKA, *Assistant Examiner.*

UNITED STATES PATENT OFFICE

CERTIFICATE OF CORRECTION

Patent No. 3,393,144                                   July 16, 1968

Harold O. Button et al.

It is certified that error appears in the above identified patent and that said Letters Patent are hereby corrected as shown below:

Column 6, line 30, after "400° F." insert --, a middle gas oil fraction boiling in the range of from about 400° F. --; same line 30, "5900° F." should read -- 590° F. --; line 32, "5900° F." should read -- 590° F. --; line 42, "+10°" should read ---10° --.

Signed and sealed this 30th day of December 1969.

SEAL)

Attest:

Edward M. Fletcher, Jr.

Attesting Officer

WILLIAM E. SCHUYLER, JR.

Commissioner of Patents